(12) United States Patent
Kurokawa et al.

(10) Patent No.: US 9,213,876 B2
(45) Date of Patent: Dec. 15, 2015

(54) OPTICAL INFORMATION READER AND ILLUMINATION CONTROL METHOD

(71) Applicant: Optoelectronics Co., Ltd., Saitama (JP)

(72) Inventors: Masaki Kurokawa, Saitama (JP); Depei Ji, Saitama (JP); Zhihui Duan, Saitama (JP)

(73) Assignee: Optoelectronics CO., Ltd., Saitama (JP)

( * ) Notice: Subject to any disclaimer, the term of this patent is extended or adjusted under 35 U.S.C. 154(b) by 0 days.

(21) Appl. No.: 14/510,382

(22) Filed: Oct. 9, 2014

(65) Prior Publication Data

US 2015/0097034 A1   Apr. 9, 2015

Related U.S. Application Data

(60) Provisional application No. 61/888,876, filed on Oct. 9, 2013.

(51) Int. Cl.
*G06K 7/00* (2006.01)
*G06K 7/10* (2006.01)

(52) U.S. Cl.
CPC .................................. *G06K 7/10752* (2013.01)

(58) Field of Classification Search
USPC .......... 235/454, 455, 462.01, 472.01–472.03, 235/462.42
See application file for complete search history.

(56) References Cited

U.S. PATENT DOCUMENTS

| | | | |
|---|---|---|---|
| 5,378,883 A * | 1/1995 | Batterman et al. | 235/462.21 |
| 5,406,062 A * | 4/1995 | Hasegawa et al. | 235/462.42 |
| 5,777,314 A * | 7/1998 | Roustaei | 235/462.42 |
| 6,173,894 B1 * | 1/2001 | Olmstead et al. | 235/462.17 |
| 2003/0189664 A1 * | 10/2003 | Olsson | 348/365 |
| 2006/0113386 A1 * | 6/2006 | Olmstead | 235/454 |
| 2006/0118627 A1 * | 6/2006 | Joseph et al. | 235/454 |
| 2009/0084855 A1 * | 4/2009 | Herwig | 235/462.41 |
| 2012/0199655 A1 * | 8/2012 | Fukuba | 235/455 |
| 2014/0231524 A1 * | 8/2014 | Liou | 235/462.21 |

OTHER PUBLICATIONS

Toshiba Corporation, "Toshiba CCD Image Sensor CCD (charge coupled device) TCD1103GFG (Rev. 2.0)", Jan. 15, 2009, pp. 1-17, Publisher: Toshiba Corporation.

* cited by examiner

*Primary Examiner* — Tuyen K Vo
(74) *Attorney, Agent, or Firm* — Brundidge & Stanger, P.C.

(57) ABSTRACT

In a barcode reader, a sensor controller sets time of one frame of a line image sensor based on output time necessary for data output of one frame from the line image sensor and lighting time of an LED. A light source controller performs first lighting control to turn on the LED only for the lighting time after termination of the data output within the time of one frame, and second lighting control to turn on the LED only for the lighting time so as to include the entire period of the data output within the time of one frame.

8 Claims, 3 Drawing Sheets

OPTICAL INFORMATION READER AND ILLUMINATION CONTROL METHOD

FIELD OF THE INVENTION

The present invention relates to an optical information reader to read information indicated with a symbol having a light reflectance different from an ambient light reflectance and to an illumination control method in the optical information reader.

BACKGROUND OF THE INVENTION

FIG. 5 shows a general block diagram of a conventional barcode reader using a linear image sensor. For example, in a linear image sensor made by Toshiba Corporation (TCD1103GFG), a CPU 10 generates an LED (Light Emitting Diode) control signal and controls light emission intensity of an LED 20 to illuminate a barcode.

Further, the CPU 10 outputs a master clock MCLK, an integration clear gate ICG and a shift gate SH to a linear image sensor 30 so as to control operation of the linear image sensor 30. A barcode image formed with an image pickup lens on a light receiving surface of the sensor is converted into an electric signal with the linear image sensor 30, and is transferred, as an output signal OS from the linear image sensor 30, to the CPU 10 side. The integration clear gate ICG is used to control frame rate of the linear image sensor 30, and the shift gate SH is used to determine whether or not an electronic shutter is to be operated based on clock pattern thereof.

FIG. 6 shows a representative example of control timing chart corresponding to the block diagram of FIG. 5.

In the conventional barcode reader, output frame time is determined based on the integration clear gate ICG of the linear image sensor 30. The shift gate SH of the linear image sensor 30 is set in an electronic shutter mode. Then exposure time of the linear image sensor 30 is determined by dividing the frame time as shown in FIG. 6.

Further, the data output time of the data output OS of the linear image sensor 30 starts from the rising edge of the integration clear gate ICG, and required time is determined based on a frequency f of the master clock MCLK of the linear image sensor 30 and the number of pixels N of the image sensor, N×2/f. For example, to output N=1500 pixels at the frequency of the master clock MCLK, f=1 MHz (mega Hertz), 1500×2/1 MHz=3 ms (milli-second) data output time is necessary. Accordingly, the frame time should be longer than 3 ms.

Further, regarding the lighting timing of the LED 20, the barcode reader turns on the LED 20 at the same time when a user starts the barcode reader, and continues the lighting of the LED 20 until the barcode has been read or a predetermined period of time has elapsed. Accordingly, as shown in FIG. 6, the LED 20 is continuously lighted for one frame time of the linear image sensor 30.

CITATION LIST

Non Patent Literature: {NPL1} "TOSHIBA CCD Image Sensor CCD (charge coupled device) TCD1103GFG Rev. 2.0", Toshiba Corporation, Jan. 15, 2009

SUMMARY OF THE INVENTION

Technical Problem

When a barcode placed at various reading distances is read using illumination by an LED, the closer the barcode is to the reader, the larger the quantity of reflected light from a barcode surface is. In other words, when the reading distance to the barcode is short, reading is possible at a low LED illumination intensity. Especially in a battery-operated reader, to prolong the battery life, it is desirable that the current necessary for the LED illumination is low.

In the conventional art shown in FIG. 6, the LED 20 is always lighted regardless of distance to the barcode. Further, since a large current (e.g. 80 mA driving current) to obtain sufficient illumination intensity upon reading of a barcode at a long distance (e.g. 200 mm or longer) at low frequency of use is applied also upon reading at a short distance such as 150 mm at high frequency of use, the battery drain is too quick.

To solve this problem of electric power consumption, it may be possible to change the lighting time of the LED 20 in correspondence with reading distance. However, when light-ON and light-OFF of the LED 20 is switched during data output from the linear image sensor 30, noise may occur in the output data due to influence of a surge voltage caused by change of current value.

The present invention has been made in view of the above situation, and has an object to, in an optical information reader which performs image reading using an image sensor to output read image data for predetermined time in one frame period while performing light projection on an object, reduce electric power consumption while performing light projection necessary for reading, and further to avoid negative effect on output data due to a surge voltage.

Solution to Problem

To attain the above object, an optical information reader of the present invention is an optical information reader which reads information indicated with a symbol having a light reflectance different from an ambient light reflectance, including: an image sensor; an illuminator to illuminate a reading object symbol; a lighting time adjuster to adjust lighting time of the illuminator; a setter to set time of one frame of the image sensor based on output time necessary for data output of one frame from the image sensor and the lighting time; a first lighting controller to perform first lighting control to turn on the illuminator only for the lighting time after termination of the data output within the time of the one frame; a second lighting controller to perform second lighting control to turn on the illuminator only for the lighting time so as to include the entire period of the data output within the time of one frame; and a switching device to switch which of the first lighting controller and the second lighting controller controls lighting of the illuminator.

In such an optical information reader, it is conceivable that light-ON and light-OFF of the illuminator is not switched during a period where the data output from the image sensor is performed.

Further, it is conceivable that the switching device performs the switching based on values of the lighting time and the output time.

Furthermore, it is also conceivable that the switching device performs the switching such that, when the lighting time is equal to or shorter than the output time, the first lighting controller controls the lighting of the illuminator, while when the lighting time is longer than the output time, the second lighting controller controls the lighting of the illuminator.

Further, in the above optical information reader, it is also conceivable that when the first lighting controller controls the lighting of the illuminator, the setter sets the time of one frame at a value obtained by adding predetermined adjustment time to the sum of the output time and the lighting time, while when the second lighting controller controls the lighting of the illuminator, the setter sets the time of one frame at a value obtained by adding the predetermined adjustment time to the lighting time.

Further, it is conceivable that the optical information reader further includes an exposure controller to expose the image sensor in synchronization with the lighting of the illuminator.

The present invention can be realized also as an illumination control method in an optical information reader, other than the above described devices.

Advantageous Effects of Invention

According to the present invention having the above configuration, in the optical information reading device which performs image reading using an image sensor to output read image data for predetermined time in one frame period while performing light projection on an object, it is possible to reduce electric power consumption while performing light projection necessary for reading.

DETAILED DESCRIPTION

An embodiment of the present invention is an illumination control method such that, in a barcode reader (optical information reader) including a linear image sensor and an illumination LED, lighting time of the LED (≅exposure time) as an illuminator is controlled in accordance with the following procedure.

1. The lighting time of the LED is from a trailing edge of a shift gate t_SH2 generated after completion of data output from the linear image sensor to a trailing edge of a shift gate t_SH1 (≅completion timing of one frame). The time t_SH2-t_SH1 is changed in correspondence with distance to a barcode (as the distance is extended, the time is extended). The time of one frame is also extended in synchronization with the change of the time t_SH2-t_SH1 (see FIG. 1).

2. When the LED lighting time t_SH2-t_SH1 exceeds the data output time from the linear image sensor, the LED lighting start timing is moved to a rising edge of shift gate t_SH0 (=t_SH2), and the LED lighting termination timing is the trailing edge of the shift gate t_SH1. The shift gate t_SH1 moves backward in accordance with increase in distance to the barcode, and the time of one frame time is extended at the same time of extension of the lighting time (see FIG. 2).

By the above-described control of the LED lighting time, ON and OFF of the LED is not changed within the time of data output from the linear image sensor, and the data outputted from the linear image sensor is not influenced by a surge voltage upon turning on or off of the LED. Further, since the LED lighting time is also changed in correspondence with distance to the barcode, it is possible to reduce electric consumption.

Hereinbelow, the present embodiment will be described in more detail with reference to the drawings.

Figure 5:
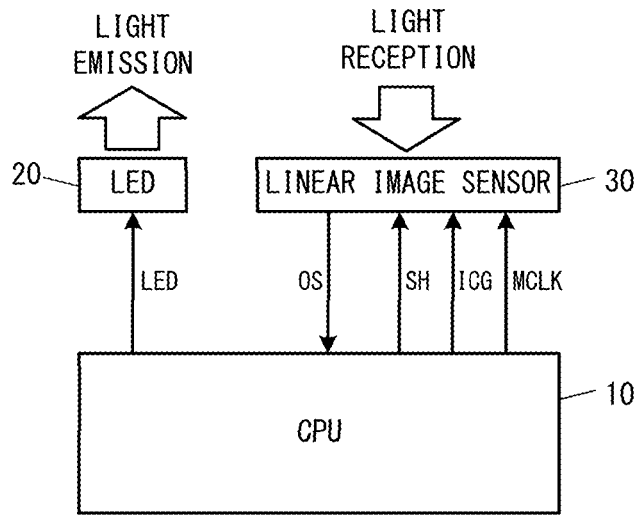
FIG. 5 is a block diagram schematically showing configuration of a conventional barcode reader using a linear image sensor.

Note that a barcode reader 100 according to the present embodiment has the same schematic hardware configuration as that of the conventional device described using in FIG. 5 except configurations for control of respective operation timings. Accordingly, regarding the hardware, the reference numerals shown in FIG. 5 will be used.

First, using FIG. 1, a lighting control method for the LED 20 in a first lighting control mode of the barcode reader 100 will be described. The first lighting control mode is used when lighting time of the LED 20 is equal to or shorter than data output time for one frame in the linear image sensor 30.

Figure 1:
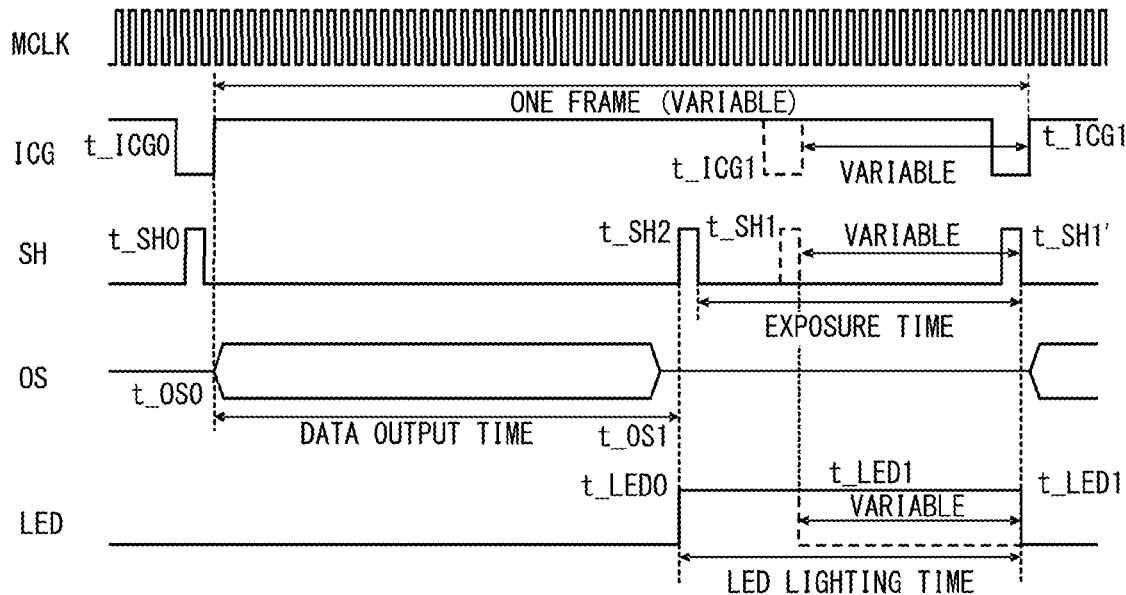
FIG. 1 illustrates an example of respective control timings in a first lighting control mode performed by a barcode reader shown in FIG. 4.

As shown in FIG. 1, in the first lighting control mode, out of the time of one frame of the linear image sensor 30, a period from timing t_SH2 to timing t_SH1 of the shift gate SH is exposure time. That is, the CPU 10 opens an electronic shutter of the linear image sensor 30 only within this period, to expose the linear image sensor 30.

Further, the CPU 10 turns on the LED 20 in synchronization with the pulse t_SH2 of the shift gate SH. That is, the CPU 10 sets the lighting time of the LED 20 to the same time as the exposure time of the linear image sensor 30, and the LED lighting is terminated at the timing t_SH1 of the shift gate SH. The lighting time of the LED 20 is always synchronized to the shift gate SH. The CPU 10 controls the lighting time along with the exposure time.

Figure 6:
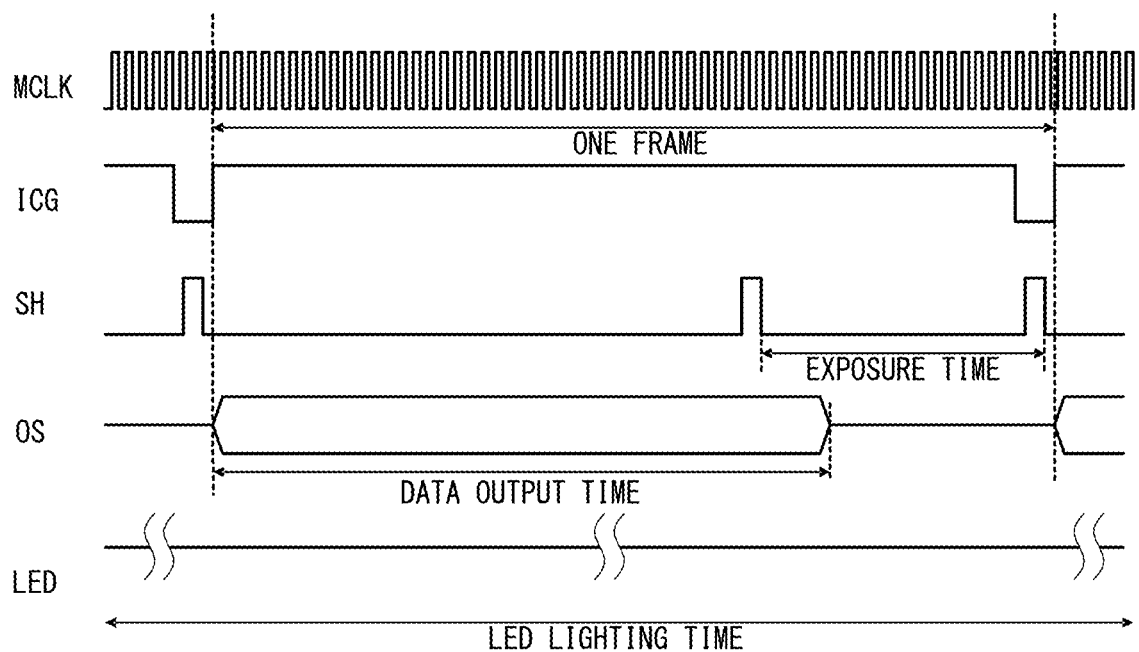
FIG. 6 illustrates a representative example of respective control timings in the barcode reader shown in FIG. 5.

With this control, in comparison with the example shown in FIG. 6, the LED is lighted only for a valid exposure time in one frame, it is possible to reduce electric power consumption.

Note that the exposure start timing of the linear image sensor 30 is the trailing edge of the pulse t_SH2 of the shift gate SH, while the lighting start timing of the LED 20 is the rising edge of the same pulse. This control is performed to slightly quicken the lighting start timing such that the LED 20 is lighted with a stabled light quantity by the exposure start of the linear image sensor 30.

Generally, exposure time to read a barcode in a short distance of 150 mm or shorter is about ⅓ of exposure time to read a barcode at a 200 mm or longer distance. For example, assuming that a peak current of the LED 20 is 80 mA, in comparison with average consumption current of 80 mA when the LED is continuously lighted as in the case of FIG. 6, the average consumption current in the LED control method in FIG. 1 is equal to or lower than 30 mA.

However, when the large current in 80 mA is applied to the LED 20, a surge voltage upon light-on start or light-off adversely influences output data from the linear image sensor 30, which increases probability of erroneous barcode signal recognition.

Accordingly, in the present embodiment, the lighting start timing t_LED0 of the LED 20 is set after the data output termination time t_OS1. Accordingly, the pulse t_SH2 of the shift gate SH of the linear image sensor 30 is also after the data output termination time t_OS1. More particularly, the CPU 10 previously determines the data output termination time t_OS1 in correspondence with master clock frequency and the number of pixels of the linear image sensor 30, then performs control so as to rise the pulse of the shift gate SH at the timing t_SH2 after the delay of predetermined time from the data output termination time t_OS1.

Further, the exposure time (≅lighting time of the LED 20) is determined based on the time t_SH1-t_SH2. The CPU 10 brings the integration clear gate ICG in synchronization with the exposure time t_SH1-t_SH2, to control timing t_ICG1. Accordingly, the frame time is t_ICG1-t_ICG0, and it is changed based on the exposure time (≅lighting time of the LED 20).

That is, the CPU 10 functions as a first lighting controller to perform first lighting control to turn on the LED 20 only during the previously set lighting time after completion of the data output within time of one frame of the linear image sensor 30. The CPU 10 does not switch light-ON and light-OFF of the LED 20 during the data output time of the linear image sensor 30. This processing corresponds to processing of a first lighting control step.

Further, the CPU 10 functions as an exposure controller to expose the linear image sensor 30 in synchronization with lighting of the LED 20. This processing corresponds to processing of an exposure control step.

Further, the CPU 10 functions as a setting device to set a period of one frame of the linear image sensor 30 based on the output time necessary for data output of one frame from the linear image sensor 30 and the lighting time of the LED 20. More particularly, a value obtained by adding predetermined adjustment time to the sum of the above-described output time and the lighting time is the period of one frame. The adjustment time is a value obtained in consideration of the above-described predetermined time delay and the timing difference between the integration clear gate ICG and the shift gate SH due to device specification (see FIG. 1). The adjustment time may be zero or a negative value. This processing corresponds to processing of a setting step.

Further, when the level of the exposure is lower than an appropriate level, the CPU 10 re-adjusts the exposure time and the lighting time of the LED 20.

For example, when the end point of the exposure time is moved to timing t_SH1' as shown in FIG. 1, the CPU 10 performs adjustment such that the integration clear gate ICG extends to the timing t_ICG1' in correspondence with the exposure time, and the lighting time of the LED 20 ends at the timing t_LED1'. By setting the timings t_LED0 and t_LED1' in this manner, it is possible to avoid change between ON and OFF of the LED 20 during the data output time of the linear image sensor 30.

In the first lighting control mode shown in FIG. 1, to solve underexposure (e.g. when a distant barcode is read), it is possible to further extend the lighting time. Upon adjustment of the lighting time, the CPU 10 functions as a lighting time adjuster. Further, the processing of the lighting time adjustment corresponds to processing of a lighting time adjustment step.

Figure 2:
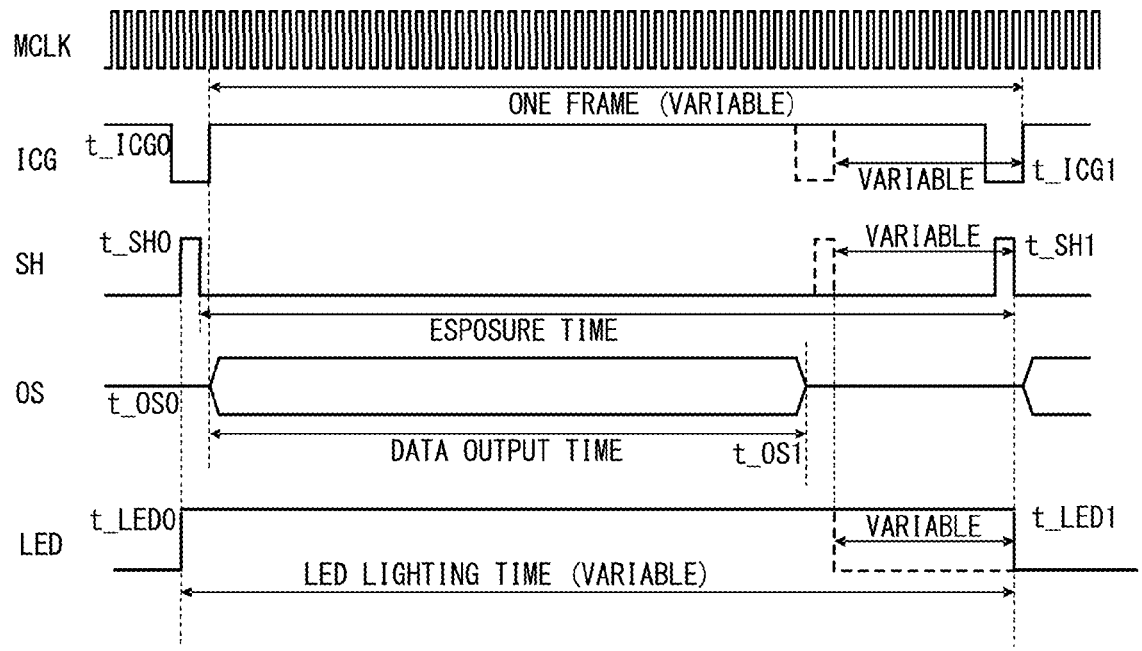
FIG. 2 illustrates an example of respective control timings in a second lighting control mode of the same.

Note that in the present embodiment, when the exposure time (≅lighting time) t_SH1-t_SH2 becomes data output time t_OS1-t_OS0, i.e., when it is necessary to set the exposure time t_SH1-t_SH2 at a value greater than the data output time t_OS1-t_OS0 to ensure sufficient exposure, the CPU 10 switches the current mode to a second lighting control mode shown in FIG. 2.

Next, the lighting time control method for the LED 20 in the second lighting control mode of the barcode reader 100 will be described using FIG. 2. The second lighting control mode is used when the lighting time of the LED 20 is longer than the data output time in one frame of the linear image sensor 30.

In the second lighting control mode, the integration clear gate ICG, the shift gate SH and the light emission time of the LED 20 are synchronized. That is, the CPU 10 exposes the linear image sensor 30 in synchronization with the lighting of the LED 20, in addition, synchronizes the one frame period of the linear image sensor 30 with the light emission time of the LED 20.

Accordingly, as the start and the end of the lighting of the LED 20 do not overlap the data output time of the linear image sensor 30, the output data is not influenced by the surge voltage.

In this case, the time of one frame of the linear image sensor 30 set with the CPU 10 is at a value obtained by adding predetermined adjustment time to the lighting time of the LED 20. The adjustment time is a value corresponding to timing difference between the integration clear gate ICG and the shift gate SH due to device specification (see FIG. 2). The adjustment time may be zero or a negative value. This processing also corresponds to processing of the setting step.

As shown in FIG. 2, in the second lighting control mode, the exposure time (≅lighting time) is from the timing t_SH0 to the timing t_SH1. The CPU 10 opens the electronic shutter of the linear image sensor 30 only for this period so as to expose the linear image sensor 30.

In the second lighting control mode, the exposure start timing of the linear image sensor 30 is the trailing edge of the pulse t_SH0 of the shift gate SH, while the lighting start timing of the LED 20 is the rising edge of the same pulse because of a similar reason to that in the case of the first lighting control mode.

Note that to prevent influence of the surge voltage, it is necessary that the lighting start timing t_LED0 of the LED 20 precedes the data output start timing t_OS0. It is desirable that there is time necessary for stabilization of the voltage applied to the LED 20, if possible.

Further, to prevent influence of the surge voltage, it is necessary that the exposure termination timing of the linear image sensor 30 (≅light-OFF timing of the LED 20) t_SH1 is subsequent to at least the data output termination timing t_OS1. However, as long as the timing t_SH1 is subsequent to the data output termination timing t_S1, it is possible to arbitrarily set the timing t_SH1.

In this manner, in the second lighting control mode, the CPU 10 functions as a second lighting controller, and performs second lighting control to turn on the LED 20 only for previously set lighting time in the time of one frame of the linear image sensor 30 such that the lighting time includes the entire data output period. The CPU 10 does not switch the light-ON and light-OFF of the LED 20 during the data output time of the linear image sensor 30. This processing corresponds to processing of a second lighting control step.

Further, it is possible to set the lighting time in the second lighting control mode at an arbitrary value longer than the time t_OS1-t_OS0. Accordingly, it is possible to continuously adjust the exposure and the lighting time to obtain appropriate exposure level, by using the first lighting control mode when the lighting time is to be shorter than the time t_OS1-t_OS0, while using the second lighting control mode when the lighting time is to be longer than the t_OS1-t_OS0. The CPU 10 functions as a switching device to perform the mode switching. This processing corresponds to processing of a switching step.

Note that when the lighting time of the LED 20 is extended only in the first lighting control mode, the frame rate is lowered in accordance with the lighting time. For example, when the lighting time is extended to the length of the data output time, the frame time including the data output time is double of the initially set value (minimum time necessary for data output). However, at this time, when the current mode is switched to the second lighting control mode, the frame time in only the fast initial value, and the substantial start of the LED light emission does not overlap the data output time. Such short frame time realizes short frame interval for data output, resulting in desirable quick system processing.

Note that it is possible to adjust the setting of the lighting time based on a detected image such that the lighting time is increased when the brightness of an image detected in the linear image sensor 30 is too low, while the lighting time is reduced when the brightness of the image is too high. Further, it may be arranged such that correspondence between distance and appropriate lighting time is previously stored, and the distance from the barcode reader 100 (or the linear image sensor 30) to a reading object such as a barcode (hereinbelow, "reading distance") is measured and lighting time corresponding to the measured distance is set. Further, it may be arranged such that the lighting time corresponding to the distance is once set then adjustment is further performed based on a detected image.

Generally, the longer the reading distance is, the longer the appropriate lighting time is. Accordingly, when the switching between the first lighting control mode and the second lighting control mode is performed as described above, change of the reading distance and that of the frame rate are as shown in FIG. 3.

Figure 3:
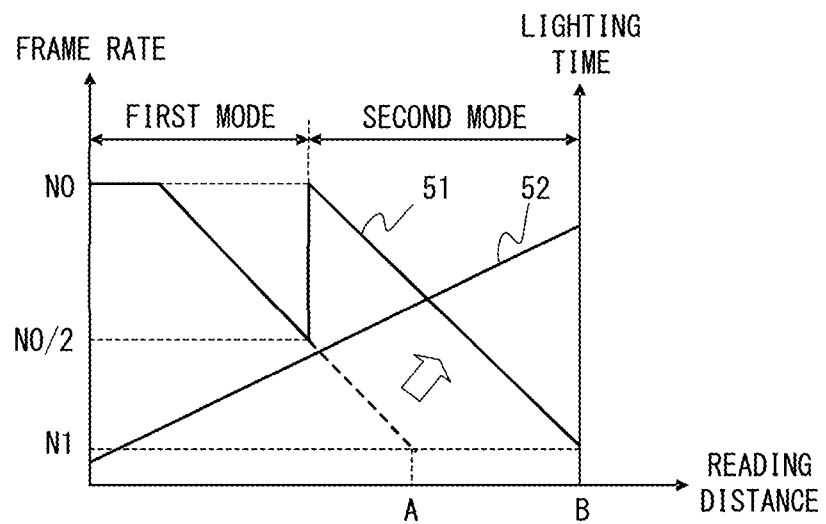
FIG. 3 is a line graph showing relation between reading distance and frame rate when control is performed by switching between the first lighting control mode and the second lighting control mode.

In FIG. 3, the lateral axis indicates the reading distance; and in the vertical axis, a line 51, the frame rate, and a line 52, the lighting time.

As shown in FIG. 3, the first lighting control mode is used when the reading distance is short. However, as the reading distance is prolonged, the necessary lighting time is gradually increased, and the period of one frame is prolonged in correspondence with the increment of the lighting time, accordingly, the frame rate of the linear image sensor 30 is gradually lowered. However, when the frame rate is lowered to the half of the initial value N0, as the lighting time is t_OS1-t_OS0, it is possible to switch the current mode to the second lighting control mode as described above. By the switching, it is possible to rise the frame rate again to the initial value N0. Even in the second lighting control mode, the frame rate is lowered in accordance with the increment of the reading distance, however, it is possible to maintain the frame rate higher than that in the first lighting control mode.

Note that when the frame rate is too low, as time from barcode reading to acquisition of decoded result is too long, there is an allowable lower limit in the frame rate. Assuming that the lower limit is N1, when the lighting time is adjusted only in the first lighting control mode, the frame rate is lowered to the lower limit N1 at a shorter distance A as indicated with a broken line. Since it is not possible to further increase the lighting time, the limit of the reading distance is a point A. However, it is possible to extend the limit of the reading distance to a point B by switching the current mode to the second lighting control mode. This is much advantageous in extension of the reading distance.

Figure 4:
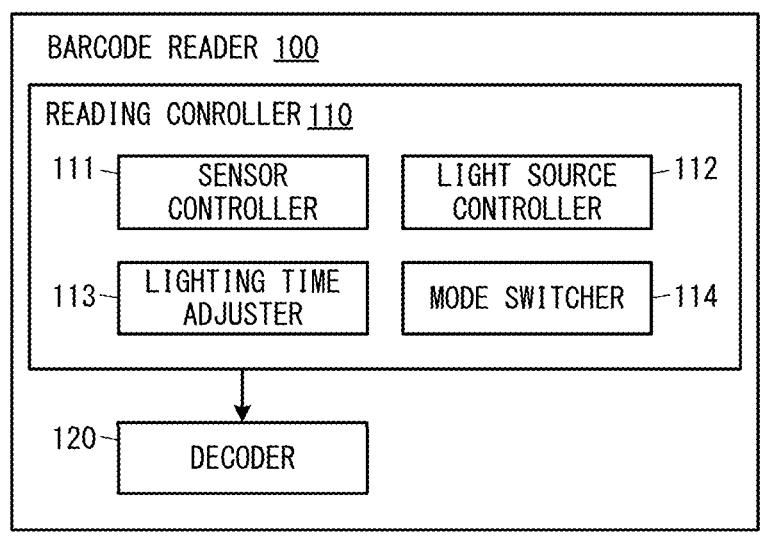
FIG. 4 is a block diagram showing a functional configuration of a barcode reader as an embodiment of an optical information reader of the present invention.

FIG. 4 shows configuration of functions to perform barcode reading while performing the above-described switching between the lighting control modes among functions of the barcode reader 100. The functions of the respective elements shown in FIG. 4 are realized by execution of a predetermined program with the CPU 10 to control operations of the respective hardware units including the LED 20 and the linear image sensor 30.

As shown in FIG. 4, the barcode reader 100 has a reading controller 110 having a function of performing control related to barcode reading, and a decoder 120 to decode data as a reading result outputted from the reading controller 110.

Further, the reading controller 110 has a sensor controller 111, a light source controller 112, a lighting time adjuster 113 and a mode switcher 114.

The sensor controller 111, corresponding to the setter and the exposure controller, has a function of outputting the master clock MCLK, the integration clear gate ICG and the shift gate SH shown in FIG. 1 and other figures to the linear image sensor 30, to control operation of the linear image sensor 30. Note that the sensor controller 111 controls the lighting timing of the LED 20 in consideration of the timings of the integration clear gate ICG and the shift gate SH. Further, the sensor controller 111 also has a function of converting the output signal OS transmitted from the linear image sensor 30 in correspondence with the respective signals into data, and outputting the resultant data to the decoder 120.

Further, the light source controller 112, corresponding to the first lighting controller and the second lighting controller, has a function of switching the light-ON and light-OFF of the LED 20 based on the lighting time of the LED 20, the lighting control mode, the data output time and the like, as described above.

The lighting time adjuster 113, corresponding to the lighting time adjuster, has a function of adjusting the lighting time of the LED 20 based on brightness of an image outputted from the linear image sensor 30, measurement result of the reading distance and the like.

The mode switcher 114, corresponding to the switching device, has a function of switching the lighting control mode to be used between the first lighting control mode and the second lighting control mode, in correspondence with whether or not the lighting time (≈the exposure time of the linear image sensor 30) of the LED 20 is longer than the data output time.

The embodiment is as described above, however, the device configuration, the sensors used there, the reading object information, the signal characteristics, the number and the timings of the signals, the particular process procedures and the like are not limited to those described in the above embodiment.

For example, the present invention is applicable to an arbitrary optical information reader which performs image reading by using an image sensor to output read image data in a predetermined period of one frame while projecting light on the object, other than the barcode reader. The reading object may be at least a symbol, a figure, an image and the like in which optical information is arranged in one direction, in addition to a barcode symbol. Further, it is possible to read a symbol, a figure, an image and the like in which optical information is two-dimensionally arranged by using an image sensor having two-dimensionally arranged reading pixels.

Further, in the above-described embodiment, the lighting time of the LED 20 and the exposure time of the linear image sensor 30 are approximately the same, however, this arrangement is not essential. The lighting time of the LED 20 may be shorter with respect to the exposure time.

Further, an arbitrary combination of the above-described constituent elements are applicable unless they conflict with each other.

INDUSTRIAL APPLICABILITY

According to the optical information reader and the illumination control method as described above, it is possible to reduce electric power consumption while performing light projection necessary for reading. Accordingly, it is possible to save electric consumption in the optical information reader.

REFERENCE SIGNS LIST

10 . . . CPU, 20 . . . LED, 30 . . . linear image sensor, 100 . . . barcode reader, 110 . . . reading controller, 111 . . . sensor controller, 112 . . . light source controller, 113 . . . lighting time adjuster, 114 . . . mode switcher, 120 . . . decoder.

What is claimed is:

1. An optical information reader which reads information indicated with a symbol having a light reflectance different from an ambient light reflectance, comprising:
  an image sensor;
  an illuminator to illuminate a reading object symbol;
  a setter to set time of one frame of the image sensor based on output time necessary for data output of one frame from the image sensor and lighting time that is set after termination of the data output; and
  a lighting time adjuster to adjust lighting time of the illuminator to perform first lighting control to turn on the illuminator only for the lighting time within the time of the one frame when exposure of the image sensor corresponding to the lighting time is equal to or more than an appropriate level for the adjusted lighting time and to perform second lighting control to turn on the illuminator for the adjusted lighting time so as to include the entire period of the data output within the time of one frame when the exposure is less than the appropriate level for the adjusted lighting time.

2. The optical information reader according to claim 1, wherein, based on the adjusted lighting time, the illuminator is not switched on and off when the data is being output from the image sensor.

3. The optical information reader according to claim 1, wherein when the first lighting control is performed, the setter sets the time of one frame at a value obtained by adding predetermined adjustment time to the sum of the output time and the lighting time, while when the second lighting control is performed, the setter sets the time of one frame at a value obtained by adding the predetermined adjustment time to the adjusted lighting time.

4. The optical information reader according to claim 1, further comprising an exposure controller to expose the image sensor in synchronization with the lighting of the illuminator.

5. An illumination control method related to an optical information reader reading information indicated with a symbol having a light reflectance different from an ambient light reflectance, comprising:
  setting time of one frame of an image sensor comprised in the optical information reader, based on output time necessary for data output of one frame from the image sensor and lighting time that is set after termination of the data output;
  calculating exposure of the image sensor corresponding to the lighting time; and
  adjusting lighting time of an illuminator comprised in the optical information reader by:
    performing first lighting control to turn on the illuminator only for the lighting time within the time of the one frame when the exposure is equal to or more than a predetermined level, and
    performing second lighting control to turn on the illuminator for adjusted lighting time so as to include the entire period of the data output within the time of one frame when the exposure is less than the predetermined level.

6. The illumination control method according to claim 5, wherein, based on the adjusted lighting time, the illuminator is not switched on and off when the data is being output from the image sensor.

7. The illumination control method according to claim 5, wherein when the first lighting control is performed, the time of one frame is set at a value obtained by adding predetermined adjustment time to the sum of the output time and the lighting time in the setting, while when the second lighting control is performed, the time of one frame is set at a value obtained by adding the predetermined adjustment time to the adjusted lighting time in the setting.

8. The illumination control method according to claim 5, further comprising:
  exposing the image sensor in synchronization with the lighting of the illuminator.

* * * * *